Dec. 26, 1939.   I. GERBER   2,184,521
GLOVE FORMING AND PRESSING MACHINE
Filed Oct. 22, 1936   3 Sheets-Sheet 1

INVENTOR
Isidor Gerber
BY
Harry Jacobson
ATTORNEY

Dec. 26, 1939.  I. GERBER  2,184,521

GLOVE FORMING AND PRESSING MACHINE

Filed Oct. 22, 1936  3 Sheets-Sheet 3

INVENTOR
Isidor Gerber
BY
Harry Jacobson
ATTORNEY

Patented Dec. 26, 1939

2,184,521

UNITED STATES PATENT OFFICE 2,184,521

GLOVE FORMING AND PRESSING MACHINE

Isidor Gerber, Brooklyn, N. Y.

Application October 22, 1936, Serial No. 106,963

9 Claims. (Cl. 223—57)

This invention relates to glove forming, heating and pressing mechanism and particularly to machines for automatically heating, stretching, pressing and advancing gloves of the cheap canvas or the like variety.

Heretofore, it has been customary in the manufacture of inexpensive canvas or other combined leather and fabric gloves of similar nature to heat each glove for a short time in order that the glove may be properly shaped or formed, and then manually to press the glove as the final operation thereon before shipment. The glove is customarily pulled manually over a heated form and stretched on the form. The operator waits while the glove is being heated, and then manually removes the glove from the form, giving it a blow with a wooden block while the glove lies on a table to press it. Since the gloves of this type must be sold at very low cost, the gloves are seldom heated for a sufficient time to permit them to be properly shaped and pressed.

My invention therefore contemplates the provision of a machine for heating the gloves for a sufficient period to shape them properly, and for automatically removing the gloves from the heated form on which they are mounted and simultaneously pressing the glove, and thereby avoiding the separate manual time-consuming dismounting and pressing operations, and also eliminating the danger of burning the hands of the operator during dismounting of the gloves.

My invention further contemplates the provision of a comparatively simple but efficient machine for dismounting or stripping gloves from the heated form on which they are mounted, after the gloves have been stretched and heated on said forms and regardless of the varying thicknesses of the gloves which may be arranged on the forms or whether they are left hand or right hand gloves, the machine being designed further efficiently and properly to press the gloves automatically and to advance the pressed gloves and to discharge them from the machine at a desired point.

The various objects of the invention will be clear from the description which follows and from the drawings, in which, Fig. 1 is a front elevation of my new machine.

Fig. 5 is a fragmentary front elevation and partial section of the form holder showing particularly the electrical connections to the heating elements of the forms.

In the practical embodiment of my invention which I have shown by way of example, heated forms are provided on which the operator mounts the glove, preferably when the form is at its uppermost position. If the glove is right-handed, the thumb is at the front of the form; if left-handed, the thumb is at the back. The glove is heated and stretched to its proper shape during the time it remains on the form. When the form reaches its lowermost position, the glove is stripped therefrom by suitable cooperating belts and advanced thereby for discharge from the machine. As shown, the various operating parts are carried by the frame 10, which is provided with a lower table 11 and an upper table 12. On the lower table 11 is mounted the electric motor 13 or other suitable source or receiver of power for driving the machine, as well as the glove dismounting and pressing belts later to be described and the operating mechanism thereof. On the upper table 12 is mounted the form holder 14 and certain of the driving means therefor, the remainder of said driving means being arranged on the lower table 11.

Figure 2:
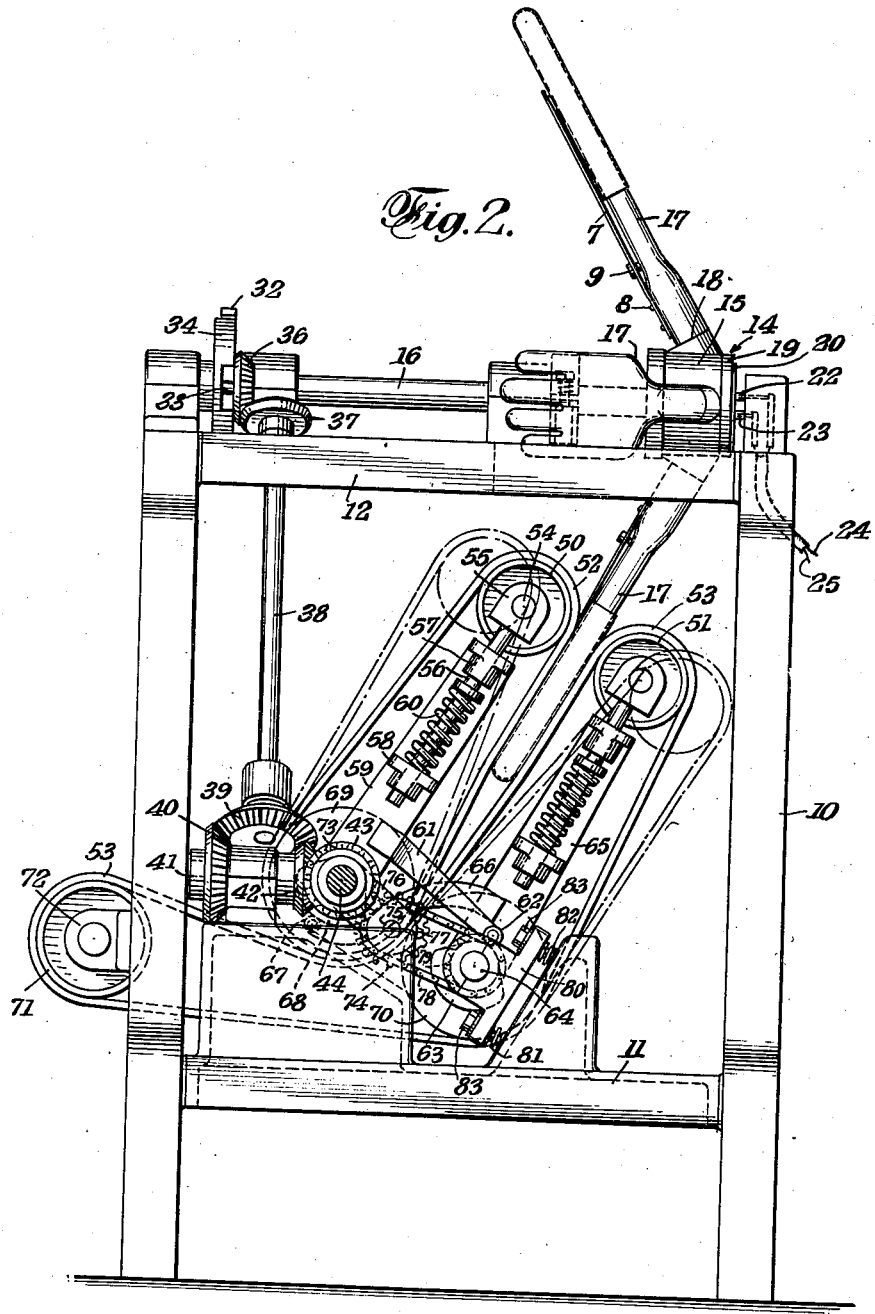
Fig. 2 is an end elevation of the same.
Figure 3:
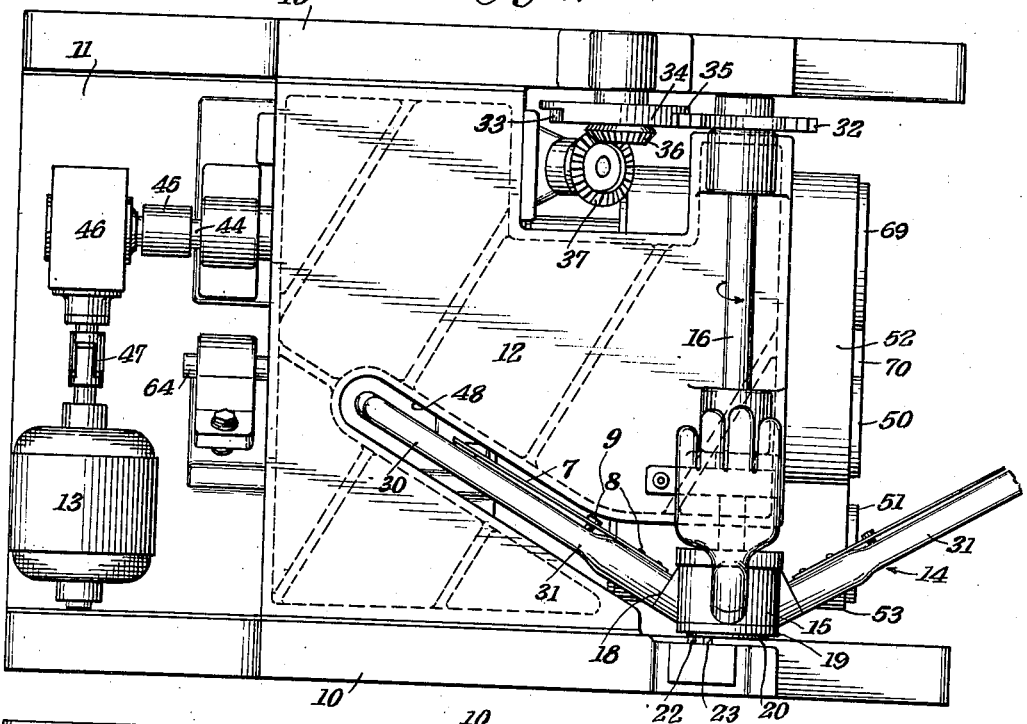
Fig. 3 is a top plan view of the same.
Figure 4:
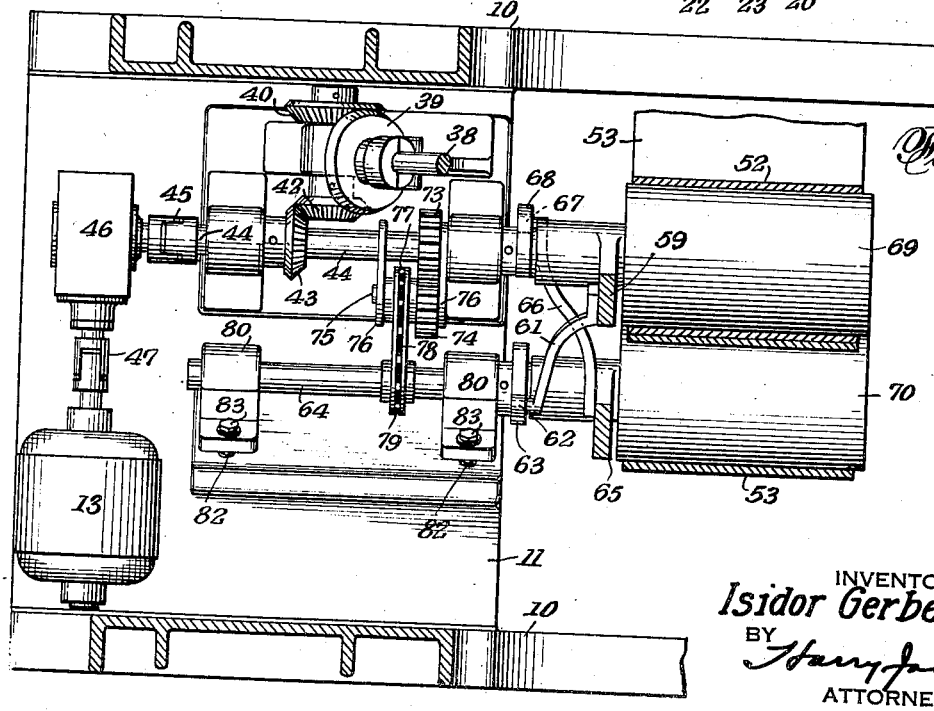
Fig. 4 is a horizontal section taken on the line 4—4 of Fig. 1.

Said form holder 14 comprises the hub 15, secured to the shaft 16 and carrying the glove forms 17. (Figs. 2, 3 and 5.) The hub is preferably, though not necessarily provided with a number of inclined surfaces against which the lower shouldered ends 18 of the glove forms are secured, so that each of said forms is inclined upwardly and rearwardly from the hub and so that the path of travel of said forms is along a conical path. To the front face of the hub and acting as a cover therefor, is secured the plate 19 of insulating material and in the face of which are set the rotatable metallic electrical contact rings 20 and 21 (Fig. 5). The relatively fixed contact members 22, 23 respectively engage the contact rings 20, 21 and receive current through the leads 24, 25 respectively from any suitable source.

The contact members 22, 23 are suitably supported in horizontal position and are preferably spring pressed into engagement with their respective contact rings. Behind the plate 19 and inside of the hub 15 are arranged the wires 26, 27 suitably connected to the respective rings 20, 21. From said wires, current is conducted to the heating coils or resistance elements 28 arranged inside of the forms 17. It will be understood that regardless of the rotation of the forms 17 through the shaft 16 and during said rotation, current is conducted to the heating elements 28 to heat the forms 17 during the operation of the machine.

Each of said forms 17 is of the usual construction having a fingered glove holding part 30 and a neck part 31, which latter part is secured to the hub 15 in any suitable manner to maintain the form in the preferably inclined position shown in the drawings.

The shaft 16 and the forms carried thereby, are intermittently rotated by suitable mechanism to give the operator time enough to mount the gloves on the forms and to properly heat them. As shown, said mechanism comprises the Geneva wheel 32 secured to the shaft 16 and cooperating with the Geneva pin 33 carried by the Geneva disc 34 which is mounted on the shaft 35. Said shaft is continuously rotated through the bevel gear 36 thereon, which meshes with the bevel gear 37 at the upper end of the inclined shaft 38. At the lower end of said shaft is secured the bevel gear 39 meshing with the bevel gear 40 on the shaft 41. On the same shaft 41 is the bevel gear 42 meshing with the bevel gear 43 on the horizontal shaft 44. Said shaft 44 is driven through the coupling 45 and through the reduction-gear mechanism 46 by the motor 13.

It will be understood that said reduction-gear mechanism 46 is of any of the usual well-known types designed to transmit power from the motor to the shaft 44 and to reduce the speed of the shaft 44 to the desired extent. A coupling as 47 may be interposed between the motor and the reduction-gear mechanism to permit substitution or repair of the reduction mechanism or motor should it be desired at any time to do so.

Figure 1:
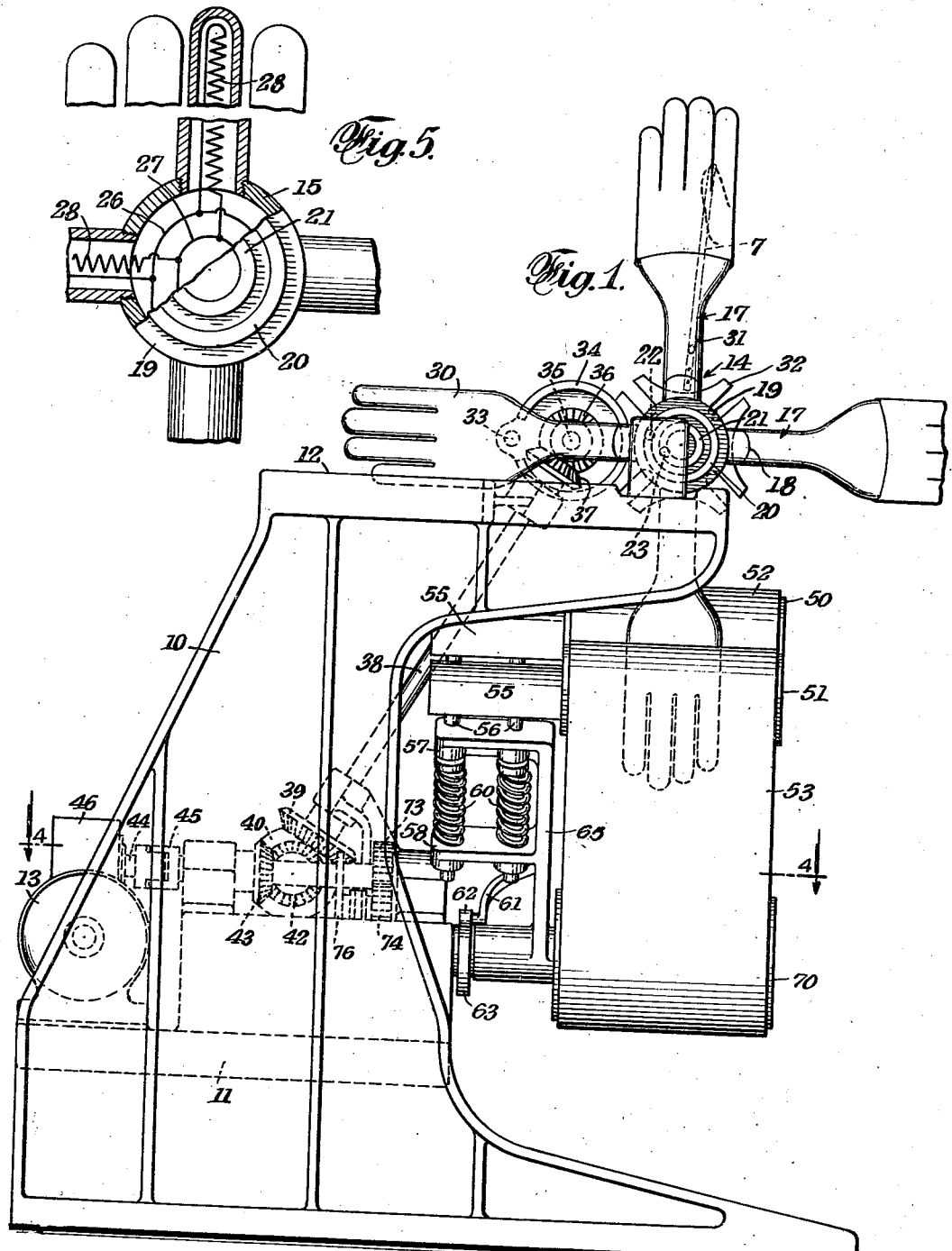

From the above description, it will be seen that on continuous rotation of the motor, the form holder 14 and the forms carried thereby, are intermittently rotated with the shaft 16 at the desired speed. During their rotation, the forms pass upwardly through the slot 48 in the upper table 12 into vertical position thereof shown in Figs. 1 and 2, in which position the operator pulls a glove over the form and thereby stretches the glove, the glove being heated by the form while it rotates into the other stations and until the glove is stripped from the form.

As has been hereinbefore indicated, the thumb of the left-hand glove is at the rear of the form when the glove is mounted thereon, said thumb tending to hang down away from the form. To insure the proper pressing of the thumb in the pressing operation later to be described, I prefer to arrange a flexible thumb holder 7 in the form of a flexible preferably metallic strip at the back of the form and sufficiently spaced therefrom to permit the operator to pull the glove over the form without interference thereby. Said thumb holder may be suitably secured at its lower end to the form as by the screws or other fasteners 8, and its distance from the form may be adjusted as by means of the thumb screw 9.

Means are provided for simultaneously removing the heated and stretched glove from the form and for advancing the glove to the point of its discharge from the machine. The station at which the stripping or glove removing operation is performed, is preferably the lowermost position of the form. It being advisable that the forms be permitted to rotate without interference from the stripping mechanism, I have provided a pair of cooperating continuously moving belts and a pair of movable stripping rolls 50, 51 about which the belts are passed and which are adapted to carry said belts 52 and 53 into engagement with the form or the glove thereon at the proper time. The belt rolls 50 and 51 and the belts carried thereby are brought into engagement with the form when the form is at rest at the stripping station. When the form is rotated, however, toward or away from said station, the rolls and the belts are in the positions indicated by the dash-dot lines of Fig. 2, thereby permitting the forms to move unhindered into and out of said station. Since the rolls 50 and 51 are similarly mounted and operated, the description of the mounting and operation of one will suffice for both.

The shaft 54 for the roll 50 is supported in the bearing 55 carried by the pair of rods 56, which in turn are slidably mounted in the bearings 57 and 58 on the rock arm 59. Compression springs 60 interposed between the bearing 58 and a suitable collar on each of the rods 56 urges said rods and the roll 50 toward the uppermost positions thereof and thereby stretches the belt 52. The arm 59 is pivoted freely at its lower end on the shaft 44, and carries the cam arm 61 provided with a roller 62 engaging the cam 63 on the horizontal shaft 64.

The roll 51 is supported similarly to the roll 50 by suitable rods and springs carried by the rock arm 65. Said rock arm is similar to the arm 59 and is freely pivoted at its lower end on the shaft 64, and carries the cam arm 66 which terminates in the roller 67 engaging the cam 68 on the shaft 44.

To continuously drive the endless belt 52, said belt passes not only about the roll 50, but also about the roll 69 on the shaft 44. Similarly, the longer endless belt 53 engages and passes partway about the roll 70 on the shaft 64 and partway about the roll 69, but the belt 53 is of sufficient length to extend and pass about the discharge roll 71, mounted revolvably on a suitable bracket 72 at the desired discharge point of the machine.

It having been pointed out that the shaft 44 is continuously rotated through the motor 13, the mechanism for similarly rotating the shaft 64 in the opposite direction while permitting automatic yielding adjustment of said shaft to its proper position, will now be described. Said mechanism comprises the gear 73 on the shaft 44 meshing with the pinion 74 on the freely swingable shaft 75. Said shaft 75 is carried by the arm 76 freely pivoted on the shaft 44. The shaft 75 also carries the sprocket wheel 77 about which passes the chain 78 engaging the sprocket wheel 79 on the shaft 64. It will be understood that the pinion 74 is self adjusting to maintain the chain 78 taut regardless of the self adjusted position of the shaft 64, since the weight of the arm 76 and of the parts carried thereby causes the free end of said arm to drop into the lowermost position thereof permitted by the chain 78.

As has been indicated, the shaft 64 is yieldably mounted to adjust itself automatically to the varying distances between said shaft and the shaft 44, caused by the passage of a glove between the belts 52 and 53. For supporting said shaft 64, the bearings 80 therefor are mounted on the compression springs 81, 82 interposed between the lower face of said bearings and the adjacent frame part, suitable nuts as 83 holding said bearing down on said springs.

It will be understood that when a glove is stripped from the form 17 and is advanced by the cooperating belts 52, 53, the distance between the shafts 64 and 44 is increased by an amount equal to the thickness of the glove when the glove passes between the rolls 69 and 70, whereby the shaft 64 and the bearings 80 move toward the frame against the action of the springs 81, 82. The springs serve to carry said bearings and the shaft 64 back to their normal positions after the glove has passed the rolls, and to maintain the belts in their proper cooperating relation.

When the glove has been brought to the stripping station and is at rest on its form 17, the cam 68 becomes operative to lower the roller 67 and thereby to swing the rock arm 65 in a counter-clockwise direction as viewed in Fig. 2 and to carry the belt 53 into contact with the form and with the glove thereon. At the same time, however, the roller 62 of the cam arm 66 is on the lowermost part of the cam 63, whereby the rock arm 59 moves by gravity in a clockwise direction to carry the belt 52 against the form and the glove. The above described movement of the arms 59 and 65 are simultaneous so that both belts are brought into operative position at the same time. Rotation of said belts 52 and 53 through the roll 69 and 70 respectively, while said belts engage the glove, causes the belts to strip the glove from the form and to advance the glove with the glove between the belts. The flexible thumb holder 7 yields at this time under the pressure of the belts and presses the thumb back against the remainder of the glove. As the glove reaches a point between the rolls 69 and 70, said glove is compressed by the belts and pressed in its heated and stretched state into its final finished form. After the glove has been stripped from its form, the cam 63 becomes operative to raise the roller 62 to rock the arm 59 in a counter-clockwise direction and thereby to remove the belt 53 from the form. Simultaneously, the cam 68 rotates to bring the low part thereof adjacent the roller 67, whereby the arm 65 moves by gravity in a clockwise direction and removes the belt 53 from the form. On the continued movement of said belts, however, the glove is advanced past the roller 69 and carried to the roll 71 for discharge from the machine and into a suitable receptacle provided therefor.

It will be seen that I have provided a simple but efficient machine capable of comparatively rapid operation for heating and stretching gloves and for automatically dismounting and pressing the heated gloves, and discharging them from the machine.

While I have shown and described a particular embodiment of my invention, I do not wish to be understood as limiting myself thereto, but intend to claim the invention as broadly as may be permitted by the state of the prior art and the scope of the appended claims.

I claim:

1. In a machine of the character described, a form holder, a series of glove forms extending from said holder, means for intermittently rotating the holder, electrically operated heating means in each of the forms, a pair of contact rings on the form holder rotatable therewith, stationary current-carrying means contacting with the rings for supplying current to said rings and therethrough to said heating means, and means for stripping a glove from the forms comprising a pair of rolls arranged on opposite sides of the form, movable belts carried by and operating said rolls, and means for oscillating said rolls bodily toward and away from said forms.

2. In a machine of the character described, intermittently rotatable means for stretching and advancing a glove, means for heating the glove-stretching and advancing means including current-carrying members in relatively slidable contact, and yieldable means including continuously moving co-acting belts for stripping the heated glove from the glove heating and advancing means while said heating and advancing means is at rest and for substantially simultaneously pressing the glove.

3. In a machine of the character described, a heated glove form, means for intermittently rotating said form, means for continuously heating said form, a pair of continuously moving belts for stripping the glove from the form, said pair of belts cooperating to press the glove therebetween and to advance the glove stripped from the form, and means for moving said belts simultaneously and in opposite directions toward and from the form.

4. In a machine of the character described, an intermittently movable glove form, means for continuously heating said form, means for stripping a heated glove from the form while the form is at rest, said stripping means also pressing and advancing the heated glove and comprising a pair of rolls disposed on opposite sides of the form, means for oscillating said rolls toward and from the form, a pair of belts passing about said rolls, means for urging said rolls in a direction to tension said belts, and means for moving said belts including a second pair of rolls, means for rotating said last mentioned rolls in opposite directions and a yieldable mounting for at least one of said rolls.

5. In a glove shaping and pressing machine, a series of intermittently movable glove stretching and heating forms, and means for removing gloves mounted on the forms comprising a pair of continuously movable cooperating belts contacting with the form and with the glove thereon while the form is at rest in a predetermined position thereof, and spring means for tensioning said belts.

6. In a machine of the character described, a glove form, means for moving the form, electrical means for heating the form independently of the movement of the form including a revoluble contact member and a relatively stationary contact member, and belt means for dismounting the heated glove from the form.

7. In a machine of the character described, a glove support, and means for dismounting a glove from the support comprising a pair of revoluble rolls arranged on one side of the form, an arm pivoted on the axis of one of the rolls and swingably supporting the other, a first endless belt for said rolls, cam means for rocking said arm, a second pair of revoluble rolls arranged on the other side of said form, a yieldable spring-pressed shaft for one of the rolls of said second pair, a second arm pivoted on said shaft and carrying the other roll of said second pair, a second cam means for rocking said second arm, a discharge roll, and a second endless belt passing about said second pair of rolls and about said discharge roll and engaging said first belt.

8. In a machine of the character described, a glove support, means for moving the support from a glove-mounting station to a glove-dismounting station, electrically operated means including a pair of relatively slidable contact members for heating said support during the movement of said support between said stations, and means for dismounting the glove at the glove-dismounting station, said last mentioned means comprising a pair of endless belts, said belts being in contact along a predetermined part of the area thereof and being spaced apart at the glove-dismounting station to permit said support to pass therebetween at said last mentioned station, and one of said belts extending past said last mentioned predetermined part to forward a dismounted glove for discharge from the machine.

9. A garment finishing machine comprising a rotatable hollow shaft; a plurality of circumferentially spaced heating forms mounted thereon; means for supplying a heating agent to said forms through said shaft; means for intermittently rotating said shaft and forms; and means for simultaneously pressing, stretching, and stripping the garments from their forms.

ISIDOR GERBER.